US009874681B2

(12) United States Patent
Yamakawa

(10) Patent No.: US 9,874,681 B2
(45) Date of Patent: Jan. 23, 2018

(54) ILLUMINATION DEVICE AND DISPLAY APPARATUS

(71) Applicant: Sakai Display Products Corporation, Sakai-shi, Osaka (JP)

(72) Inventor: Ryo Yamakawa, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 15/023,963

(22) PCT Filed: Sep. 24, 2014

(86) PCT No.: PCT/JP2014/075269
§ 371 (c)(1),
(2) Date: Mar. 22, 2016

(87) PCT Pub. No.: WO2015/046239
PCT Pub. Date: Apr. 2, 2015

(65) Prior Publication Data
US 2016/0238782 A1   Aug. 18, 2016

(30) Foreign Application Priority Data

Sep. 25, 2013   (JP) ................. 2013-198465

(51) Int. Cl.
*F21V 7/04*      (2006.01)
*F21V 8/00*      (2006.01)
(52) U.S. Cl.
CPC ........... *G02B 6/0088* (2013.01); *G02B 6/002* (2013.01); *G02B 6/009* (2013.01); *G02B 6/0073* (2013.01); *G02B 6/0085* (2013.01)

(58) Field of Classification Search
CPC ...... G02B 6/002; G02B 6/0085; G02B 6/009; G02B 6/0088
USPC .................................................. 362/621, 628
See application file for complete search history.

(56) References Cited

U.S. PATENT DOCUMENTS

| | | | | |
|---|---|---|---|---|
| 6,669,350 B2* | 12/2003 | Yamashita | ............. | G02B 5/045 362/23.07 |
| 7,195,391 B2* | 3/2007 | Lin | ......................... | G02B 6/002 362/612 |
| 7,314,301 B2* | 1/2008 | Wu | ...................... | G02B 6/0016 362/606 |
| 7,637,646 B2* | 12/2009 | Byun | ................... | G02B 6/0016 349/65 |

(Continued)

FOREIGN PATENT DOCUMENTS

| | | |
|---|---|---|
| JP | 2011-192490 A | 9/2011 |
| JP | 2012-237826 A | 12/2012 |

*Primary Examiner* — Peggy Neils
*Assistant Examiner* — William N Harris
(74) *Attorney, Agent, or Firm* — Rudy J. Ng; Bret E. Field; Bozicevic, Field & Francis LLP

(57) ABSTRACT

An illumination device according to one embodiment of the present invention comprises a light guide plate configured to emit light from inside through one surface of the light guide plate and a light source disposed to face a peripheral surface of the light guide plate. In the display apparatus, during non-light emitting of the light source, for distance s between the light source and the peripheral surface, a distance between a middle part of the light source in a peripheral edge direction of the light guide plate and a portion in the peripheral surface corresponding to the middle part is the longest.

4 Claims, 8 Drawing Sheets

(56) References Cited

U.S. PATENT DOCUMENTS

| | | | |
|---|---|---|---|
| 2010/0149802 A1* | 6/2010 | Chang | G02B 6/002 |
| | | | 362/235 |
| 2011/0141715 A1* | 6/2011 | Uchida | G02B 6/002 |
| | | | 362/19 |
| 2012/0287371 A1 | 11/2012 | Oura | |

* cited by examiner

ILLUMINATION DEVICE AND DISPLAY APPARATUS

CROSS-REFERENCE TO RELATED APPLICATIONS

This application is the national phase under 35 U.S.C. § 371 of PCT International Application No. PCT/JP2014/075269 which has an International filing date of Sep. 24, 2014 and designated the United States of America.

FIELD

The present invention relates to an illumination device, in which light having been emitted by a light source and having entered a light guide plate is released from one surface of the light guide plate, and a display apparatus including the illumination device.

BACKGROUND

A liquid crystal display apparatus includes a liquid crystal display panel, and a backlight unit which illuminates the liquid crystal display panel from a back side of the liquid crystal display panel.

Hereinafter, a case in which the liquid crystal display panel is disposed in a vertical position will be described.

Conventionally, an edge light type backlight unit has been proposed (see Japanese Patent Laid-Open Publication No. 2012-237826, which is hereinafter referred to as Patent Document 1). The edge light type backlight unit includes a light guide plate which is rectangular provided at the back side of the liquid crystal display panel through an optical sheet group, and a light source disposed to face a lower end face of the light guide plate. The light source is formed by mounting a plurality of LEDs disposed apart from each other in a horizontal direction on one surface of an LED substrate.

Light emitted by the light source is transmitted through the lower end face of the light guide plate, and enters the light guide plate. The light having entered the light guide plate is emitted from a front surface of the light guide plate. The light emitted from the front surface of the light guide plate enters the liquid crystal display panel through diffusion, light collection, or the like by the optical sheet group.

When the liquid crystal display panel is uniformly illuminated by the backlight unit, a display region of the liquid crystal display panel becomes uniformly bright.

However, if variations are present in a distance between each LED and the light guide plate, an amount of light having entered the light guide plate from each LED becomes uneven. The reason is that the light emitted by the LEDs away from the light guide plate is unlikely to be made incident on the light guide plate compared to the light emitted by the LEDs near the light guide plate. Thereby, the light is likely to be unevenly emitted from the front surface of the light guide plate. As a result, not only illumination by the backlight unit becomes uneven, but also brightness of the liquid crystal display panel becomes uneven. Accordingly, an image quality of the liquid crystal display panel is deteriorated.

Then, in the display apparatus (a 'liquid crystal module' in text thereof) described in Patent Document 1, a lower portion of the light guide plate is partially in contact with the LED substrate, such that the distance between each LED and the light guide plate is constantly maintained. In such the display apparatus, it is possible to suppress the variations in the distance between each LED and the light guide plate due to a position shift of the light guide plate.

SUMMARY

In the meantime, the light guide plate is thermally expanded by heat generated during light-emitting of the light source. In this case, a portion near a high temperature part of the light source in a peripheral edge part of the light guide plate is more likely to occur thermal expansion than a portion near a low temperature part of the light source. Accordingly, the distance between the LED and the portion near the high temperature part of the light source in the peripheral edge part of the light guide plate is shorter than the distance between the LED and the portion near the low temperature part of the light source in the peripheral edge part of the light guide plate. As a result, the variations in the distance between each LED and the light guide plate occur.

Patent Document 1 does not describe technical matters for suppressing the variations in the distance between each LED and the light guide plate due to the thermal expansion of the light guide plate.

In consideration of the above-mentioned circumstances, it is a major object of the present invention to provide an illumination device capable of uniformly illuminating and a display apparatus.

An illumination device according to one embodiment of the present invention comprises a light guide plate configured to emit light from inside through one surface of the light guide plate and a light source disposed to face a peripheral surface of the light guide plate. In the display apparatus, during non-light emitting of the light source, for distance s between the light source and the peripheral surface, a distance between a middle part of the light source in a peripheral edge direction of the light guide plate and a portion in the peripheral surface corresponding to the middle part is the longest.

In the illumination device according to the embodiment of the present invention, during non-light emitting of the light source, a portion in a peripheral edge part of the light guide plate corresponding to the middle part may be a concave shape.

In the illumination device according to the embodiment of the present invention, during non-light emitting of the light source, for the distance s between the middle part of the light source in a direction following the peripheral edge direction and the portion in the peripheral surface corresponding to the middle part, a distance corresponding to a central portion in the peripheral edge direction may be the longest, and may be configured to be continuously or stepwise decreased from the central portion to both sides in the peripheral edge direction.

A display apparatus according to one embodiment of the present invention comprises the illumination device according to the one embodiment of the present invention and a display panel which is illuminated by the illumination device from a back side of the display panel.

According to the one embodiment of the present invention, during non-light emitting of the light source, that is, during non-thermal expansion of the light guide plate, the distance between the light source and the peripheral surface of the light guide plate may be uneven. More particularly, the distance between the middle part of the light source and the portion in the peripheral surface of the light guide plate corresponding to the middle part of the light source may be the longest.

Herein, in the present disclosure, the middle part/both end parts of the light source mean the middle part/both end parts of the light source in the peripheral edge direction of the light guide plate (hereinafter, briefly referred to as the peripheral edge direction).

The light guide plate is thermally expanded by heat generated during light-emitting of the light source. Then, the peripheral surface of the light guide plate is closer to the light source than during non-thermal expansion of the light guide plate.

A temperature of the light source due to the heat generated from the light source is higher in the middle part of the light source than in the respective both end parts of the light source. Thereby, the portion in the peripheral surface of the light guide plate corresponding to the middle part of the light source is more likely to occur thermal expansion than the other parts. Therefore, an amount of approach in which the portion in the peripheral surface of the light guide plate corresponding to the middle part of the light source is close to the light source by the thermal expansion is the largest.

In other words, a portion of the light guide plate separated most from the light source during non-thermal expansion of the light guide plate (that is, when the illumination device is not used) is closest to the light source during thermal expansion of the light guide plate (that is, when using the illumination device). Therefore, when using the illumination device, the distance between the light source and the peripheral surface of the light guide plate becomes uniform. Accordingly, an amount of light having entered the light guide plate from light source becomes uniform in the peripheral edge direction. As a result, the illumination by the illumination device becomes uniform in the peripheral edge direction.

Briefly, in order to make the amount of light having entered the light guide plate when using the illumination device uniform in the peripheral edge direction, the distance between the light source and the light guide plate when the illumination device is not used is deliberately made to be uneven in the peripheral edge direction.

According to the embodiment of the present invention, during non-light emitting of the light source, that is, during non-thermal expansion of the light guide plate, the portion in the peripheral surface of the light guide plate corresponding to the middle part of the light source is the concave shape. Therefore, the distance between the light source and the light guide plate becomes uneven in the peripheral edge direction.

Briefly, by forming the shape of the light guide plate during non-thermal expansion of the light guide plate different from the conventional light guide plate, the amount of light having entered the light guide plate may be made to be uniform in the peripheral edge direction.

Forming the shape of the peripheral edge part of the light guide plate different from the conventional light guide plate is more simply achieved, for example, than forming the shape of the light source from the conventional light source. In other words, in the illumination device, the amount of light having entered the light guide plate may be made to be uniform in the peripheral edge direction by a simple configuration.

According to the embodiment of the present invention, for the distance s between the middle part of the light source and the portion in the peripheral surface of the light guide plate corresponding to the middle part of the light source, the distance corresponding to the central portion in the peripheral edge direction is the longest, and is configured to be continuously or stepwise decreased from the central portion in the peripheral edge direction to the both sides in the peripheral edge direction. Such the light guide plate is particularly preferable in a case that an amount of heat generated from the light source is symmetric in the peripheral edge direction.

According to one embodiment of the illumination device and the display apparatus of the one embodiment of present invention, by making the distance between the light source during non-light emitting of the light source, that is during non-thermal expansion of the light guide plate and the light guide plate uneven in the peripheral edge direction, it is possible to make the amount of light having entered the light guide plate uniform in the peripheral edge direction. Thereby, it is possible to make illumination by the illumination device uniform in the peripheral edge direction. Further, it is possible to make the brightness of the display region of the display panel uniform in the peripheral edge direction. Therefore, the image quality of the display panel may be improved.

The above and further objects and features will more fully be apparent from the following detailed description with accompanying drawings.

DETAILED DESCRIPTION

Figure 1:
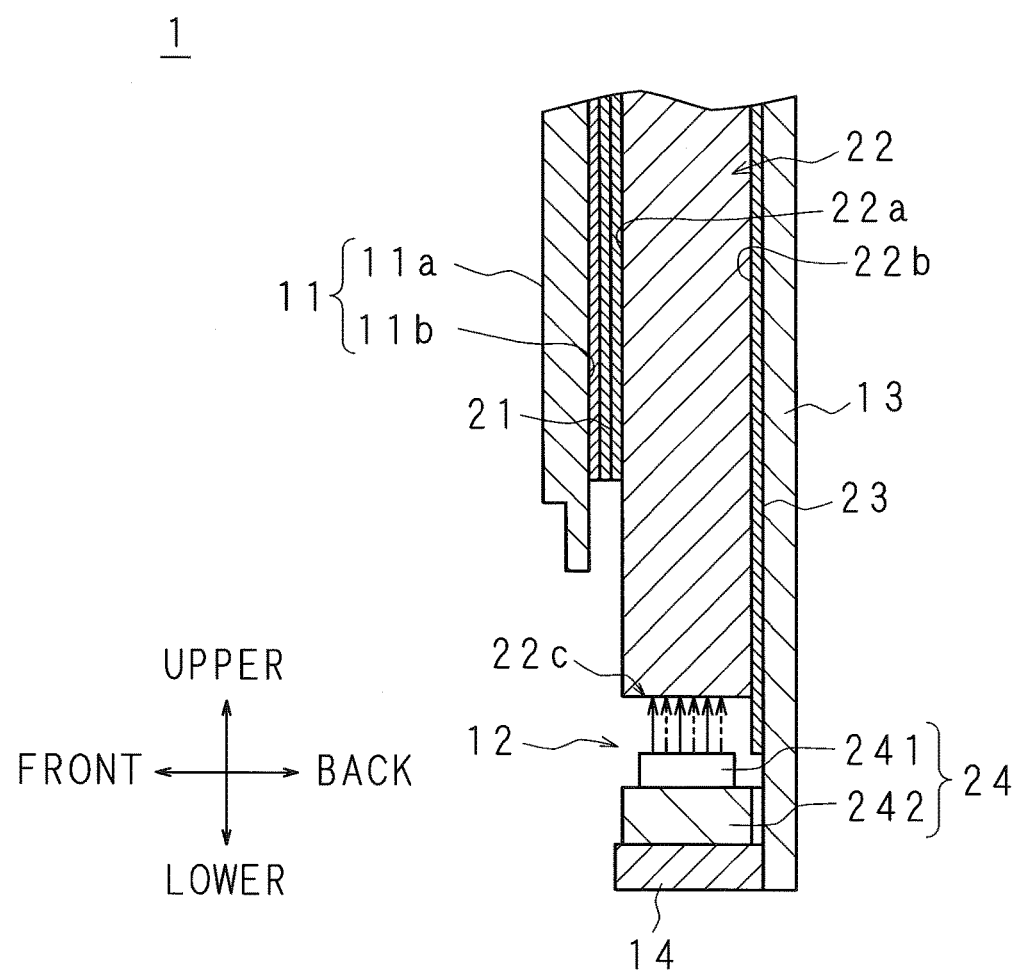
FIG. 1 is a longitudinal-sectional view schematically illustrating a configuration (a right end part or a left end part of a light guide plate) of a display apparatus according to Embodiment 1 of the present invention.

Hereinafter, the present invention will be described in detail with reference to the accompanying drawings illustrating embodiments thereof. In the following description, upper and lower, back and front, and right and left illustrated by arrows in the drawings are used.

Embodiment 1

Figure 2:
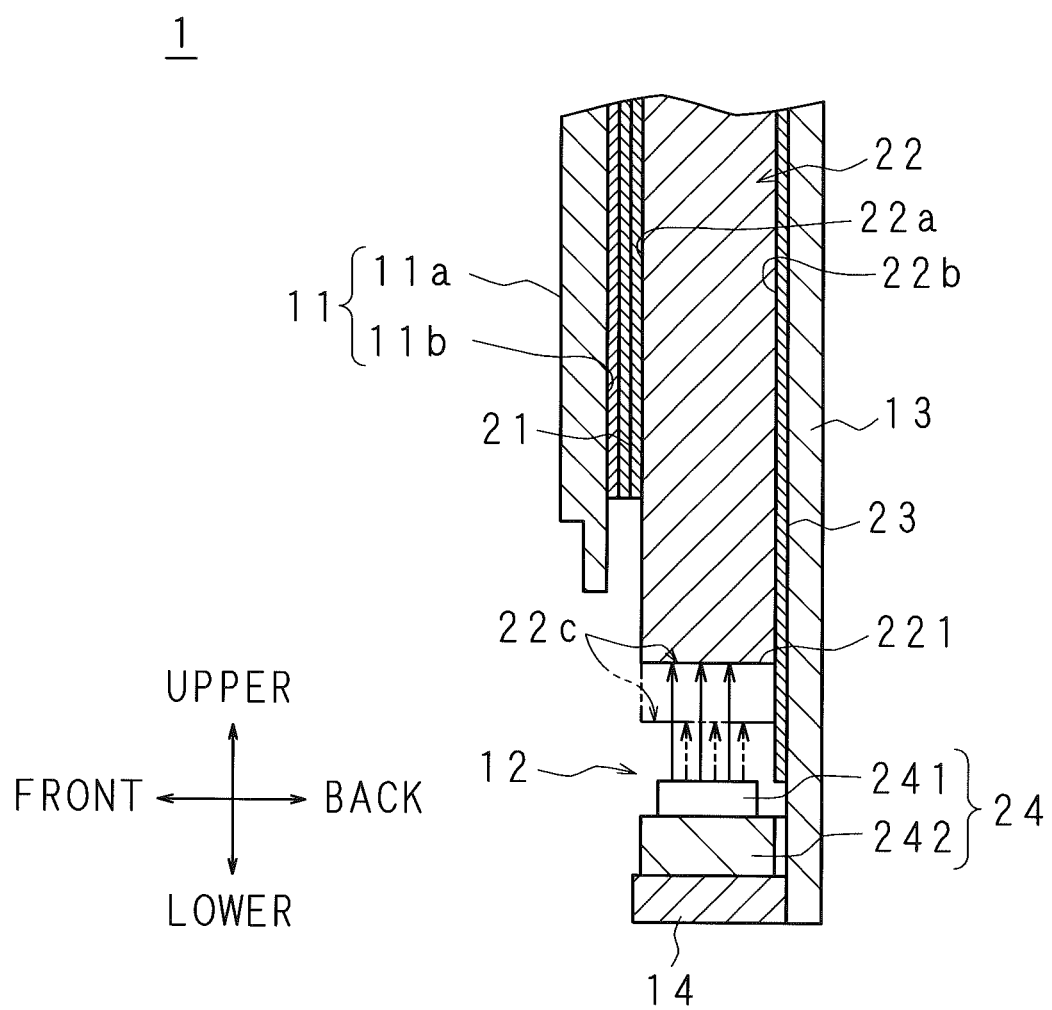
FIG. 2 is a longitudinal-sectional view schematically illustrating the configuration (a horizontal middle part of the light guide plate) of the display apparatus.

FIGS. 1 and 2 are longitudinal-sectional views schematically illustrating a configuration of a display apparatus 1 according to Embodiment 1 of the present invention. FIGS. 1 and 2 illustrate the vicinity of a lower side part a light guide plate 22 to be described below. And, FIG. 1 illustrates a right end part or a left end part of the light guide plate 22, and FIG. 2 illustrates a horizontal middle part of the light guide plate 22.

Figure 3:
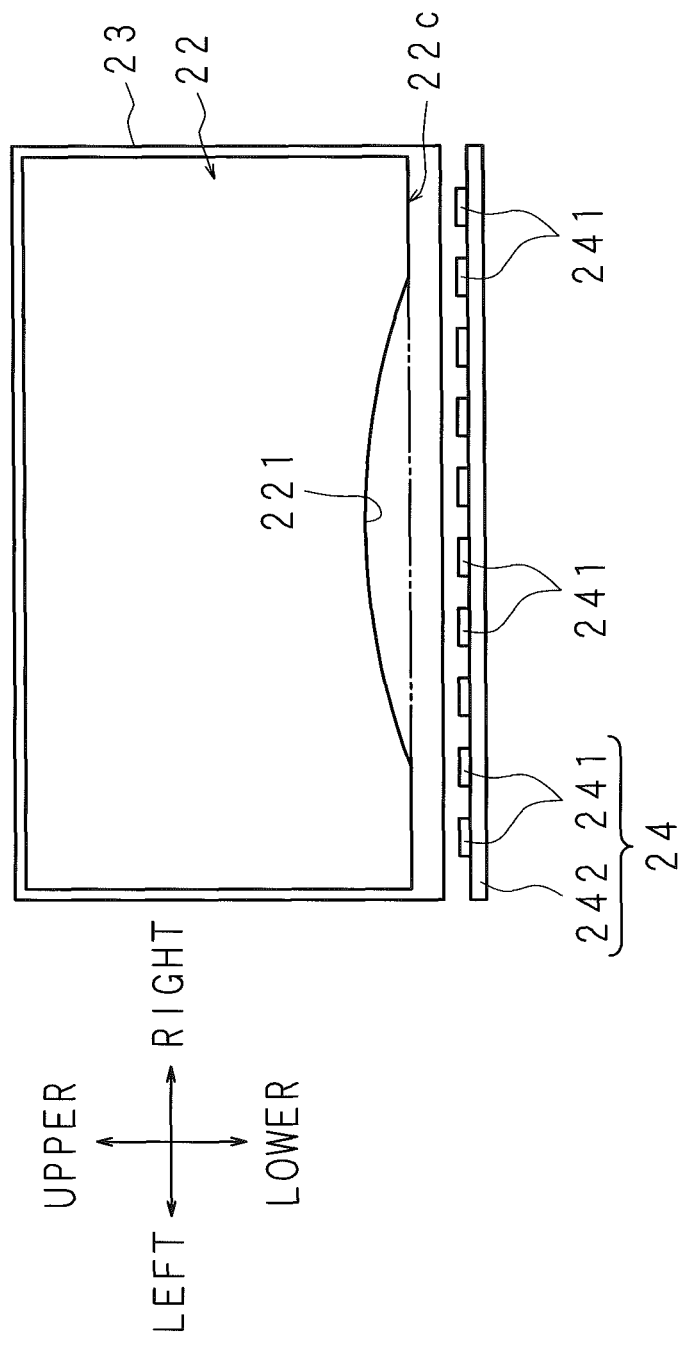
FIG. 3 is a front view schematically illustrating a positional relationship between the light guide plate and a light source included in a backlight unit as an illumination device according to Embodiment 1 of the present invention.

FIG. 3 is a front view schematically illustrating a positional relationship between the light guide plate 22 and a light source 24 included in a backlight unit 12 as an illumination device according to Embodiment 1 of the present invention.

The display apparatus 1 of the present embodiment is formed as, for example, a television receiving apparatus, a digital signage, a monitor for personal computer or the like.

First, the configuration of the display apparatus 1 will be described.

The display apparatus 1 includes a display panel 11, the backlight (illumination device) 12, a backlight chassis 13, a heat sink 14, a cabinet (not illustrated) which houses these components while a display region in a front surface 11a of the display panel 11 is exposed to an outside and the like.

The display panel 11 is formed using a liquid crystal display panel. The display panel 11 is formed in a rectangular shape, and is disposed in a vertical position. The display panel 11 has a glass substrate on the front surface 11a side and a glass substrate on a back surface 11b side. Liquid crystal is sealed between the two glass substrates. Light transmittance of the display panel 11 is changed depending on a voltage applied to the liquid crystal of the display panel 11. A middle part of the display panel 11 in a plane direction thereof is a rectangular display region, and a peripheral edge part of the display panel 11 is a rectangular frame-shaped frame region.

The backlight chassis 13 is formed in a dish shape to house the backlight unit 12. The backlight chassis 13 has a back surface part corresponding to a bottom of a dish, and a peripheral surface part (not illustrated) corresponding to the peripheral surface of the dish. The back surface part of the backlight chassis 13 is formed in a plate shape disposed in a vertical position.

The backlight unit 12 is supported by the backlight chassis 13, the cabinet, and the like between the display panel 11 and the back surface part of the backlight chassis 13.

The backlight unit 12 has an optical sheet group 21, the light guide plate 22, a reflection sheet 23, and the light source 24.

The optical sheet group 21 is formed by laminating a plurality of optical sheets each of which is formed in a rectangular shape. The optical sheet group 21 is disposed in close contact with a middle part of the back surface 11b of the display panel 11. A length of the optical sheet group 21 in each direction of vertical and horizontal directions is larger than the length of the display region of the display panel 11 in each direction of vertical and horizontal directions. The optical sheet group 21 covers the display region in the back surface 11b of the display panel 11. Each optical sheet included in the optical sheet group 21 has a light diffusion function, a light collection function and the like.

The light guide plate 22 is formed in a rectangular plate shape. The light guide plate 22 may be made of an acrylic resin, for example. The length of the light guide plate 22 in the horizontal direction (hereinafter, referred to as a horizontal length) is longer than the horizontal length of the display panel 11.

Unlike a conventional light guide plate 220 to be described below, the length of the light guide plate 22 in the vertical direction (hereinafter, referred to as a vertical length) is not constant. In particular, for the vertical length of the light guide plate 22, the vertical length in a horizontal central portion is the shortest, and the vertical length in right and left end parts is the longest. The shortest vertical length of light guide plate 22 is a length of the vertical length of the display panel 11 or more. In the horizontal middle part of the light guide plate 22, the vertical length of the light guide plate 22 is continuously increased from the horizontal central portion to right and left sides.

Briefly, the horizontal middle part in the lower side part (a peripheral edge part) of the light guide plate 22 is formed in an upward-concave shape. Hereinafter, the concaved portion in the lower side part of the light guide plate 22 is referred to as a concave part 221. A peripheral edge shape of the concave part 221 is formed in a gentle mountain shape.

Further, it may be configured in such a manner that the vertical length in the horizontal middle part of the light guide plate 22 is stepwise increased from the horizontal central portion to the right and left sides.

In addition, the peripheral edge shape of the concave part 221 is not limited to the mountain shape, and may be formed in a rectangular shape, a semielliptical shape, or a triangular shape, etc.

The light guide plate 22 emits (that is, surface emits) the light having entered the light guide plate 22 from a front surface (one surface) 22a of the light guide plate 22. For this purpose, the light guide plate 22 is provided with a plurality of reflection parts (not illustrated) on a back surface 22b thereof. The reflection parts are provided by performing silk printing, laser printing, molding, or the like on the back surface 22b. The light made incident on the reflection parts is reflected to a region face to the front surface 22a. The light having entered the light guide plate 22 is reflected by the front surface 22a, back surface 22b, or the reflection parts of the light guide plate 22, and finally, is released through the front surface 22a to emit to an outside of the light guide plate 22. However, a part of the light having entered the light guide plate 22 may transmit through the back surface 22b (that is, light leakage occurs).

The reflection sheet 23 is formed in a rectangular shape having vertical length and horizontal length which are longer than the vertical length and the horizontal length of the light guide plate 22. The horizontal length of the reflection sheet 23 is the same level as the horizontal length of the light source 24.

The reflection sheet 23 is disposed in close contact with back surface of the light guide plate 22, and completely covers a back surface 22b of the light guide plate 22. Accordingly, the light leaked from the back surface 22b of the light guide plate 22 is reflected by the reflection sheet 23, and enters again the light guide plate 22.

The heat sink 14 is disposed under the light guide plate 22. The heat sink 14 is supported by the backlight chassis 13. Heat conducted to the heat sink 14 is discharged to the outside of the display apparatus 1.

The light source 24 is disposed on the heat sink 14. The light source 24 includes a plurality of LEDs 241, 241 and . . . , and an LED substrate 242.

The LED substrate 242 is formed in a laterally long rectangular flat plate shape in a horizontal position.

The LEDs 241, 241 and . . . are equidistantly mounted on an upper surface of the LED substrate 242 in a row in the horizontal direction. The LEDs 241, 241 and . . . , and a lower end face (peripheral surface) 22c of the light guide plate 22 are disposed to face each other with being separated at an appropriate length.

Hereinafter, the middle part/both end parts of the light source 24 in the peripheral edge direction of the light guide plate 22 are referred to as middle part/both end parts of the light source 24. In the present embodiment, the middle part/both end parts of the light source 24 are middle part/ right and left end parts of the light source 24 in the horizontal direction thereof (a long-side direction of the light source 24).

The LED 241 is not present on a left side from the left end part (or a right side from the right end part) of the light source 24. Meanwhile, the LEDs 241, 241 and . . . are present on horizontal both sides of the middle part of the light source 24. Therefore, an amount of heat generated in the middle part of the light source 24 is larger than the amount of heat generated in the left end part (or the right end part) of the light source 24, and a temperature of the middle part of the light source 24 is higher than the temperature of the left end part (or the right end part) of the light source 24. In other words, the temperature of the light source 24 is uneven in the horizontal direction. In addition, the temperature of the light source 24 is bilaterally symmetrical.

Heat emitted by the LEDs 241, 241 and . . . is conducted to the heat sink 14 through the LED substrate 242. In addition, heat emitted by the LEDs 241, 241 and . . . is transferred to the light guide plate 22 by radiation, convection, or conduction.

For distance s between a lower end face 22c of the light guide plate 22 and the light source 24, a distance between the horizontal middle part in the lower end face 22c of the light guide plate 22 (a portion in the peripheral surface of the light guide plate 22 corresponding to the middle part of the light source 24, that is an inner surface of the concave part 221) and the middle part of the light source 24 is the longest. In more detail, the distance corresponding to a central portion of the concave part 221 in the horizontal direction thereof is the longest, and the distance is continuously decreased from the central portion of the concave part 221 in the horizontal direction to the right and left sides.

Next, illumination of the display panel 11 by the backlight unit 12 will be described.

Light emitted by the light source 24 is transmitted through the lower end face 22c of the light guide plate 22, and enters the light guide plate 22.

The light having entered the light guide plate 22 is emitted from the front surface 22a of the light guide plate 22. The light emitted from the light guide plate 22 enters the optical sheet group 21 which made light-diffusion, light-collection, or the like, and enters the display panel 11 through the back surface 11b of the display panel 11.

As described above, the display panel 11 is illuminated from the back surface 11b side by the backlight unit 12. The light having entered the display panel 11 is transmitted through the display panel 11, or is blocked from passing through the display panel 11. As a result, an image is displayed on the display region of the display panel 11.

Next, action effects of the backlight unit 12 will be described. For this purpose, first, a difference in a configuration between the backlight unit 12 and the conventional backlight unit will be described.

Figure 4:
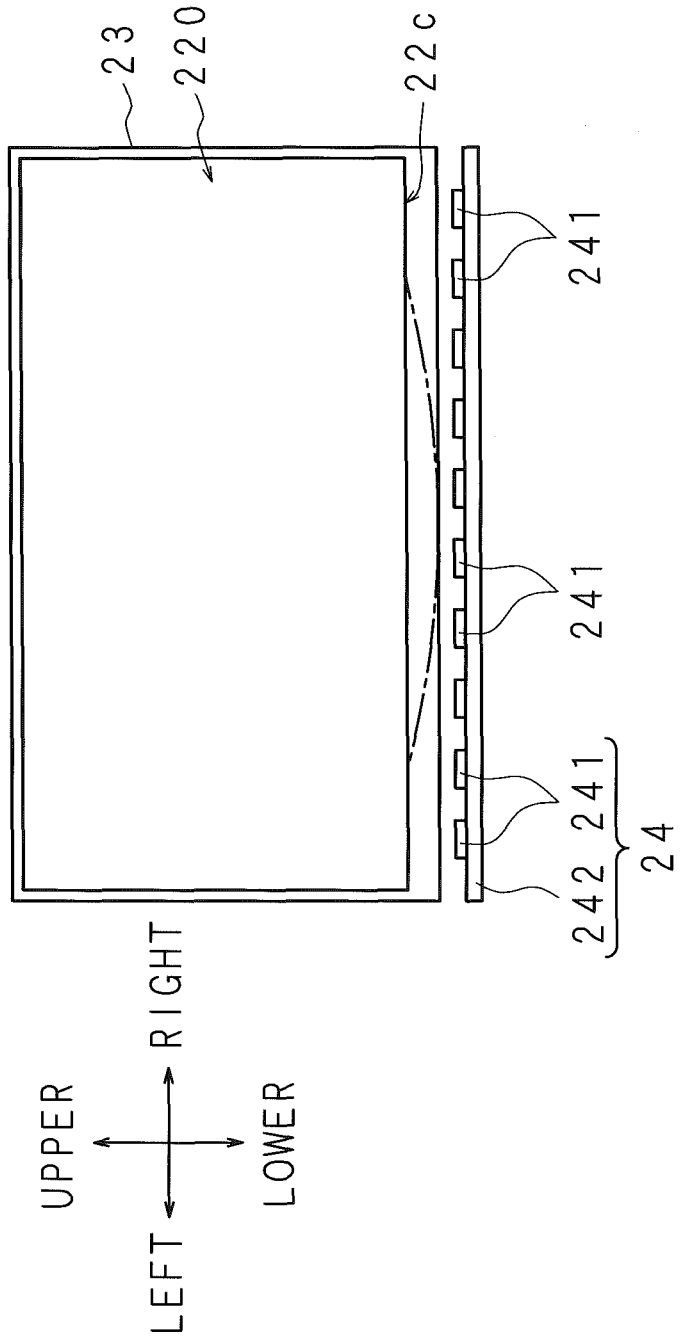
FIG. 4 is a front view schematically illustrating a positional relationship between a light guide plate and a light source included in a conventional backlight unit.

FIG. 4 is a front view schematically illustrating a positional relationship between the light guide plate 220 and the light source 24 included in the conventional backlight unit.

The conventional backlight unit has substantially the same configuration as the backlight unit 12. However, the conventional backlight unit includes a rectangular light guide plate 220, instead of the light guide plate 22.

The horizontal length of the light guide plate 220 is equal to the horizontal length of the light guide plate 22.

The vertical length of the light guide plate 220 is constant. The vertical length of the light guide plate 220 is larger than the shortest vertical length of the light guide plate 22, and is the length of the longest length thereof or less.

In the meantime, when the light guide plate 220 is replaced by a light guide plate 220 having a vertical length of 0.3 mm longer in the downward direction, luminance in the surface emission of the light guide plate 220 is increased by 10%. This indicates that the shortening/lengthening of the distance from the light guide plate 220 to the light source 24 and the increasing/decreasing of the luminance in the surface emission of the light guide plate 220 have a correlation with each other.

Briefly, with the distance from the light source 24 to the light guide plate 220 being decreased (or increased), the amount of light having entered the light guide plate 220 is increased (or decreased), and the luminance in the surface emission of the light guide plate 220 is increased (or decreased).

For the conventional backlight unit, the temperature of the middle part of the light source 24 is higher than the temperature of the left end part (or the right end part) of the light source 24.

The temperature of the lower side part of the light guide plate 220 is raised by heat generated during light-emitting of the light source 24. In this case, the temperature of the horizontal middle part in the lower side part of the light guide plate 220 is higher than the temperature of the respective right and left end parts in the lower side part of the light guide plate 220. Therefore, the horizontal middle part in the lower side part of the light guide plate 220 is more likely to be thermally expanded than the respective right and left end parts in the lower side part of the light guide plate 220.

In FIG. 4, a shape of the light guide plate 220 during non-thermal expansion is illustrated by a solid line, and the shape of the light guide plate 220 during thermal expansion is illustrated by a dashed-two dotted line. A deformation amount due to the thermal expansion of the respective right and left end parts in the lower side part of the light guide plate 220 is smaller than the deformation amount due to the thermal expansion of the horizontal middle part in the lower side part of the light guide plate 220, such that this state is not illustrated in FIG. 4.

During non-thermal expansion of the light guide plate 220, the lower side part of the light guide plate 220 is formed in a horizontal straight line. Therefore, the distance between the lower end face of the light guide plate 220 and the light source 24 is constant.

On the other hand, during thermal expansion of the light guide plate 220, a downward-concave part is generated in the lower side part of the light guide plate 220 by the horizontal middle part. Therefore, the distance between the lower end face of the light guide plate 220 and the light source 24 becomes uneven. In particular, the distance between the horizontal middle part in the lower end face of the light guide plate 220 and the light source 24 is shorter than the distance between the respective right and left end parts in the loser end face of the light guide plate 220 and the light source 24.

Accordingly, for the amount of light having entered the light guide plate 220 from the light source 24, the amount of light having entered through the horizontal middle part of the light guide plate 220 is larger than the amount of light having entered through the left end part (or the right end part) of the light guide plate 220.

Thereby, the surface emission of the light guide plate 220 becomes uneven in the horizontal direction. In particular, the horizontal middle part of the light guide plate 220 is bright, and the respective right and left end parts become dark.

If the unevenness in the horizontal direction relating to the surface emission of the light guide plate 220 is not resolved by the diffusion function of the optical sheet group 21, illumination by the conventional backlight unit becomes uneven. Accordingly, the brightness of the display region of the display panel 11 becomes uneven in the horizontal direction.

Also for the backlight unit 12, the temperature of the middle part of the light source 24 is higher than the temperature of the left end part (or the right end part) of the light source 24. Therefore, the horizontal middle part in the lower side part of the light guide plate 22 is more likely to be thermally expanded than the respective right and left end parts in the lower side part of the light guide plate 22.

In FIGS. 1 to 3, a shape of the light guide plate 22 during non-thermal expansion/during thermal expansion and the light entered the light guide plate 22 from the light source 24 are illustrated by a solid line/dashed-two dotted line. The deformation amount due to the thermal expansion of the respective right and left end parts in the lower side part of the light guide plate 22 is smaller than the deformation amount due to the thermal expansion of the horizontal middle part in the lower side part of the light guide plate 22, such that this state is not illustrated in FIGS. 1 to 3.

During non-thermal expansion of the light guide plate 22, the lower side part of the light guide plate 22 has the concave part 221. Therefore, the distance between the lower end face 22c of the light guide plate 22 and the light source 24 is uneven.

On the other hand, during thermal expansion of the light guide plate 22, the lower side part of the light guide plate 22 is formed in a straight-line shape in the horizontal direction, with a form of complimenting the concave part 221 by the expanded portion of the horizontal middle part in the lower side part of the light guide plate 22. Therefore, the distance between the lower end face 22c of the light guide plate 22 and the light source 24 becomes constant.

Accordingly, for the amount of light having entered the light guide plate 22 from the light source 24, the having entered through the horizontal middle part of the light guide plate 22, and the amount of light having entered through the left end part (or the right end part) of the light guide plate 22 are at the same level as each other. In other words, the amount of light having entered the light guide plate 22 becomes uniform in the horizontal direction.

Thereby, the surface emission of the light guide plate 22 becomes uniform. Therefore, the illumination by the backlight unit 12 becomes uneven in the horizontal direction. Accordingly, the display region of the display panel 11 becomes uniformly bright in the horizontal direction.

In the display apparatus 1 including the above-described backlight unit 12, the display region of the display panel 11 is uniformly bright in the horizontal direction, such that an image quality of the image displayed on the display region may be improved.

In this regard, after using of the display apparatus 1 starts, and before completely expanding of the light guide plate 22 during non-thermal expansion due to heat generated by the light source 24 ends, the distance between the lower end face 22c of the light guide plate 22 and the light source 24 is uneven. In addition, after using the display apparatus 1 ends, the light guide plate 22 with being thermally expanded is compressed by natural cooling. Accordingly, the display apparatus 1 is suitable for a continuously used application for a long period of time, an intermittently used application at a time interval to an extent that the light guide plate 22 is not significantly contracted or the like.

Further, when the backlight unit 12 includes the light guide plate 220, the light source 24 may include an LED substrate whose horizontal middle part is bent downward, an LED substrate whose horizontal middle part is located under from the right and left end parts so as to be provided in a stepped shape, or the like, instead of the LED substrate 242 of the light source 24. According to the above-described configuration, since the horizontal middle part of the light guide plate 220 during non-thermal expansion and the middle part of the light source 24 are relatively separated from each other, and the right and left end parts of the light guide plate 220 and the both end parts of the light source 24 are relatively close to each other, the distance between the light guide plate 220 during thermal expansion and the light source 24 is constantly maintained, and eventually, the amount of light having entered the light guide plate 220 from the light source 24 may become uniform in the horizontal direction.

However, the above-described LED substrate is unusual. In addition, a space in which the LED substrate is disposed may be vertically increased. Accordingly, as in the present embodiment, using the light guide plate 22 is advantageous.

In the present embodiment, since the temperature of the light source 24 is bilaterally symmetrical, the light guide plate 22 is also formed in a bilaterally symmetrical shape. Therefore, if the temperature of the light source 24 is bilaterally unsymmetrical, the light guide plate 22 may be also formed in a bilaterally unsymmetrical shape.

Further, in the present embodiment, the light source 24 is disposed to face the lower end face 22c of the light guide plate 22. However, the backlight unit 12 may include the light source 24 disposed to face an upper end face of the light guide plate 22, instead of the lower end face 22c of the light guide plate 22, or together with the light source 24 disposed to face the lower end face 22c of the light guide plate 22. In this case, a part corresponding to the concave part 221 may be provided at a part of an upper side part of the light guide plate 22.

Embodiment 2

Figure 5:
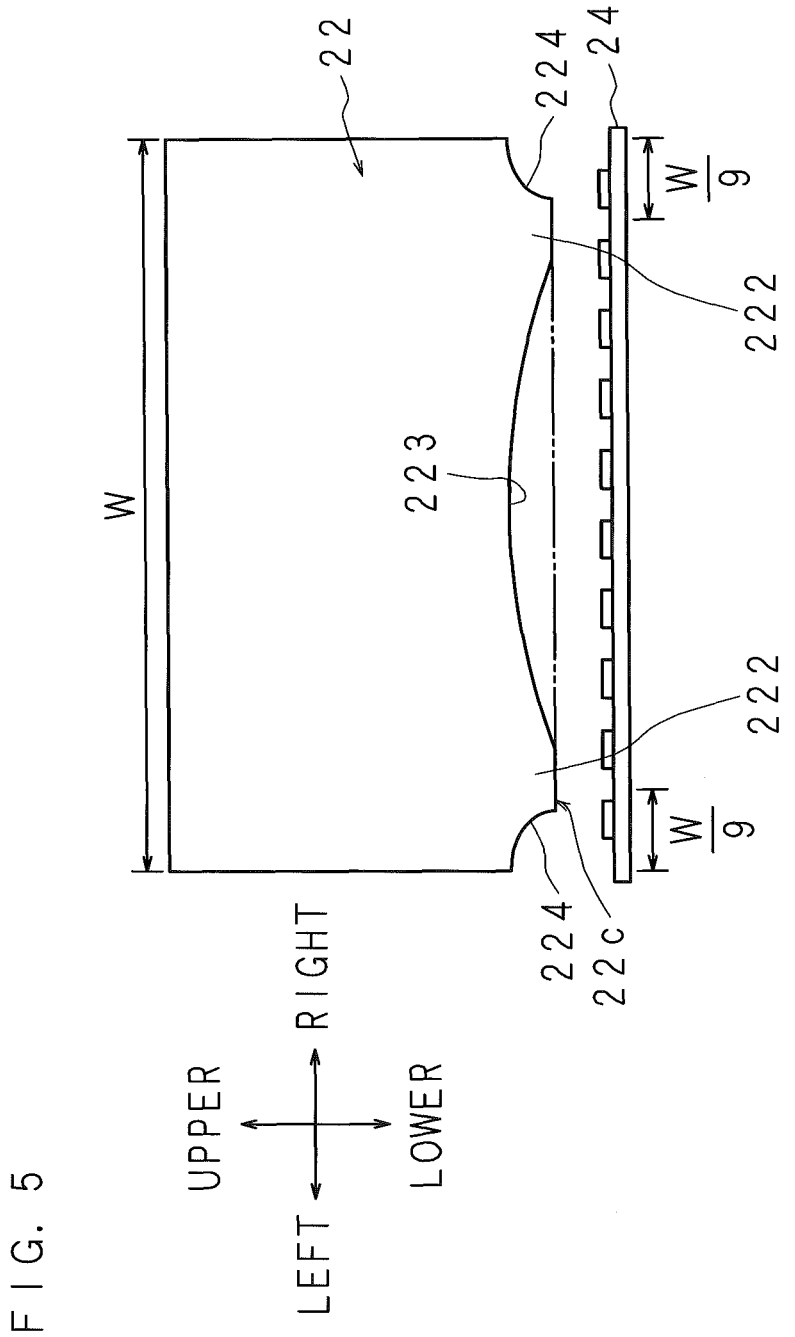
FIG. 5 is a front view schematically illustrating a positional relationship between a light guide plate and a light source included in a backlight unit as an illumination device according to Embodiment 2 of the present invention.

FIG. 5 is a front view schematically illustrating a positional relationship between a light guide plate 22 and a light source 24 included in a backlight unit 12 according to Embodiment 2 of the present invention. FIG. 5 corresponds to FIG. 3 of Embodiment 1. However, the reflection sheet 23 will not be illustrated.

The backlight unit 12 of the present embodiment has substantially the same configuration as the backlight unit 12 of Embodiment 1. Hereinafter, a difference from Embodiment 1 will be described, and the other portions corresponding to Embodiment 1 will be denoted by the same reference numerals, and will not be described.

In general, in the right and left end parts of the display region of the display panel 11, it is less likely to display an important image compared to the horizontal middle part thereof. Therefore, some users may desire that a range in which the important image is displayed is more uniformly bright than that the display region is entirely uniformly bright in the horizontal direction. For such the users, it is preferable that the right and left end parts of the display region are relatively darker than the horizontal middle part thereof as in the prior art.

For this purpose, the light guide plate 22 of the present embodiment does not have the concave part 221, unlike the light guide plate 22 of Embodiment 1.

When the horizontal length of the light guide plate 22 is set to be a horizontal length W, the light guide plate 22 is provided with convex parts 222 and 222 in the lower side part thereof at positions of a distance {W/9} from the right and left end parts. A concave part 223 is present between the convex parts 222 and 222, and concave parts 224 and 224 are present at right and left sides from the convex parts 222 and 222.

Accordingly, for the distance s between the lower end face 22c of the light guide plate 22 during non-thermal expansion and the light source 24, both of the distance between the horizontal middle part in the lower end face 22c of the light guide plate 22 (that is, the concave part 223) and the middle part of the light source 24, and the distance between the right and left end parts (that is, the concave parts 224 and 224) in the lower end face 22c of the light guide plate 22 and the both end parts of the light source 24 are the longest.

When using the above-described light guide plate 22, for the surface emission of the light guide plate 22, narrow ranges of the right and left end parts are relatively dark, and a wide range of the horizontal middle part is relatively bright, as well as the brightness becomes uniform. As a result, it is possible to set the brightness of the display region of the display panel 11 to a level desired by the user.

Embodiment 3

Figure 6:
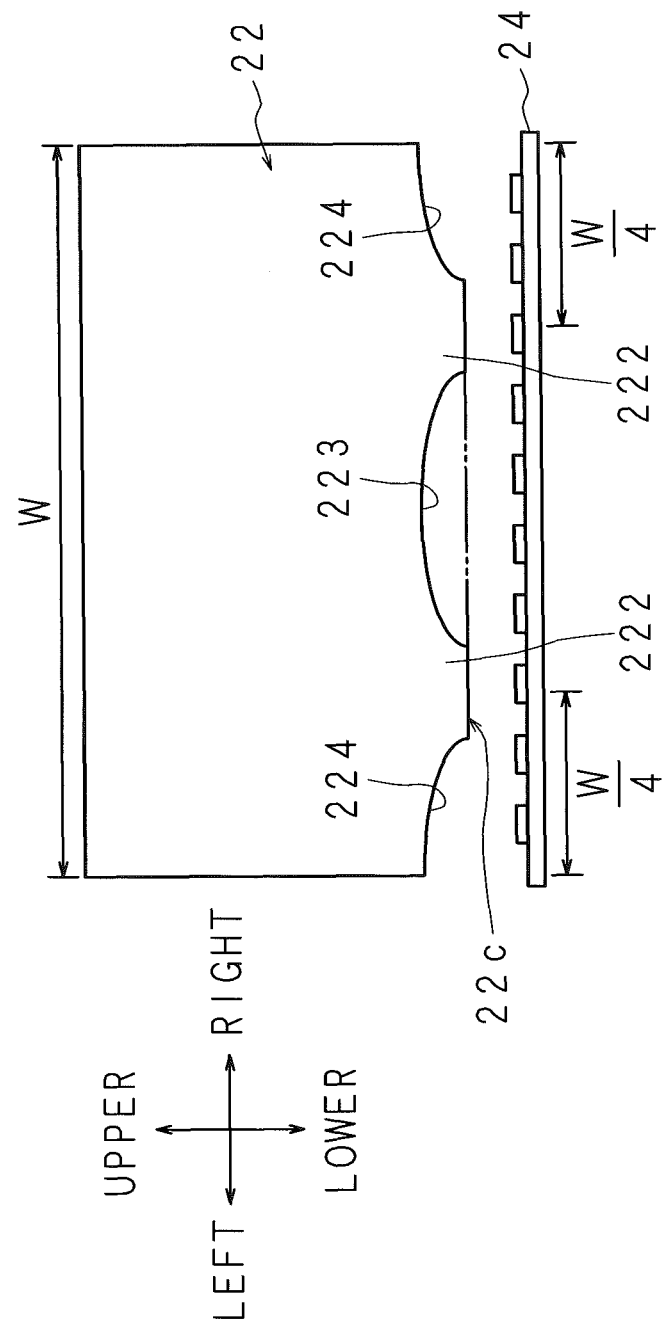
FIG. 6 is a front view schematically illustrating a positional relationship between a light guide plate and a light source included in a backlight unit as an illumination device according to Embodiment 3 of the present invention.

FIG. 6 is a front view schematically illustrating a positional relationship between a light guide plate 22 and a light source 24 included in a backlight unit 12 according to Embodiment 3 of the present invention. FIG. 6 corresponds to FIG. 5 of Embodiment 2.

The backlight unit 12 of the present embodiment has substantially the same configuration as the backlight unit 12 of Embodiment 2. Hereinafter, a difference from Embodiment 2 will be described, and the other portions corresponding to Embodiment 2 will be denoted by the same reference numerals, and will not be described.

In the case of Embodiment 2, the convex parts 222 and 222 are disposed in the arrangement at positions of the distance {W/9} from the right and left end parts of the light guide plate 22, but in the case of the present embodiment, the convex parts 222 and 222 are disposed in the arrangement at positions of a distance {W/4} from the right and left end parts of the light guide plate 22.

Also, when using the above-described light guide plate 22, for the surface emission of the light guide plate 22, the right and left end parts are relatively dark, and the horizontal middle part is relatively bright, as well as the brightness becomes uniform. However, the relatively dark range of the right and left end parts are wider than the case of Embodiment 2, and the relatively bright range of the horizontal middle part is narrower than the case of Embodiment 2.

As can be seen from Embodiments 2 and 3, by appropriately designing the shape of the light guide plate 22, the surface emission of the light guide plate 22 may be made to be uniform in a required range. Therefore, the required range may be uniformly illuminated by the backlight unit 12. As a result, the display apparatus 1 is capable of improving the image quality of the image displayed on the display region of the display panel 11 as desired by the user.

Embodiment 4

Figure 7:
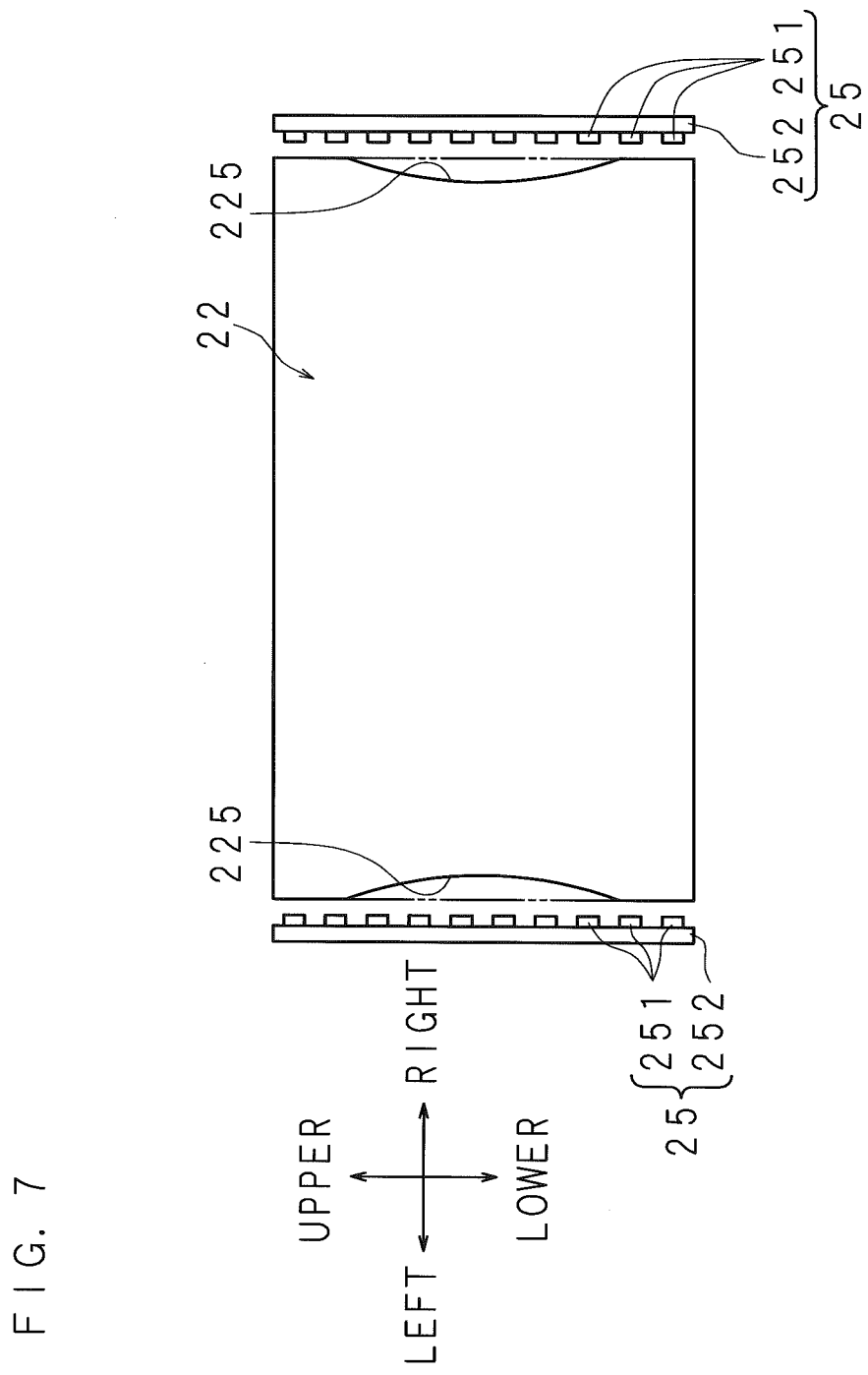
FIG. 7 is a front view schematically illustrating a positional relationship between a light guide plate and a light source included in a backlight unit as an illumination device according to Embodiment 4 of the present invention.

FIG. 7 is a front view schematically illustrating a positional relationship between a light guide plate 22 and a light source 24 included in a backlight unit 12 according to Embodiment 4 of the present invention. FIG. 7 corresponds to FIG. 3 of Embodiment 1. However, the reflection sheet 23 will not be illustrated.

The backlight unit 12 of the present embodiment has substantially the same configuration as the backlight unit 12 of Embodiment 1. Hereinafter, a difference from Embodiment 1 will be described, and the other portions corresponding to Embodiment 1 will be denoted by the same reference numerals, and will not be described.

The backlight unit 12 of Embodiment 1 is an edge light type in which the light source 24 is disposed under the light guide plate 22.

Meanwhile, the backlight unit 12 of the present embodiment is a side edge light type in which light sources 25 and 25 are provided at right and left sides of the light guide plate 22.

Thereby, the backlight unit 12 includes a heat sink (not illustrated) which serves to exhaust heat respectively generated from the light sources 25 and 25 and the light sources 25 and 25, instead of the light source 24 and the heat sink 14 of Embodiment 1.

In addition, the light guide plate 22 has concave parts 225 and 225, instead of the concave part 221 unlike the light guide plate 22 of Embodiment 1.

Each light source 25 includes LEDs 251, 251 and . . . , and an LED substrate 252 substantially the same as the LEDs 241, 241 and . . . , and the LED substrate 242 of light source 24.

The LED substrate 252 is formed in a vertically long rectangular shape in a vertical position. The LED substrate 252 is disposed so that one surface thereof faces a side end face (a left side end face or a right side end face) of the light guide plate 22.

The LEDs 251, 251 and . . . are equidistantly mounted on one surface of the LED substrate 252 in a row in the vertical direction. The LEDs 251, 251 and . . . , and the side end face of the light guide plate 22 are disposed to face each other with being separated at an appropriate length.

The temperature of the light source 25 is uneven in the vertical direction. In addition, the temperature of the light source 25 is top-bottom symmetrical.

The horizontal length of the light guide plate 22 during non-thermal expansion is uneven in the vertical direction. Thereby, the vertical middle part in a left side part of the light guide plate 22 is formed in a rightward-concave shape. Similarly, the vertical middle part in a right side part of the light guide plate 22 is formed in a leftward-concave shape. The concave parts 225 and 225 are concaved-portions in the right and left end parts of the light guide plate 22.

Light emitted by the light sources 25 and 25 is transmitted through right and left side end faces of the light guide plate 22, and enters the light guide plate 22.

The above-described backlight unit 12 and the display apparatus 1 achieve the same action effects as the backlight unit 12 and the display apparatus 1 of Embodiment 1 in the vertical direction.

By the thermal expansion of the light guide plate 22 due to heat generated during light-emitting of the light sources 25 and 25, the concave parts 225 and 225 are lost from the right and left side parts of the light guide plate 22, and thereby the distance between the light sources 25 and 25 and the right and left side end faces of the light guide plate 22 becomes constant. Accordingly, the amount of light having entered the light guide plate 22 becomes uniform in the vertical direction.

Thereby, the surface emission of the light guide plate 22 becomes uniform in the vertical direction. Therefore, the illumination by the backlight unit 12 becomes uniform in the vertical direction. Accordingly, the display region of the display panel 11 becomes uniformly bright in the vertical direction.

In the display apparatus 1 including the above-described backlight unit 12, the display region of the display panel 11 is uniformly bright in the vertical direction, such that the image quality of the image displayed on the display region may be improved.

Further, the backlight unit 12 may have a configuration which includes only the left (or right) light source 25. In this case, it is not necessary to provide the right (or left) concave part 225 of the light guide plate 22.

Embodiment 5

Figure 8:
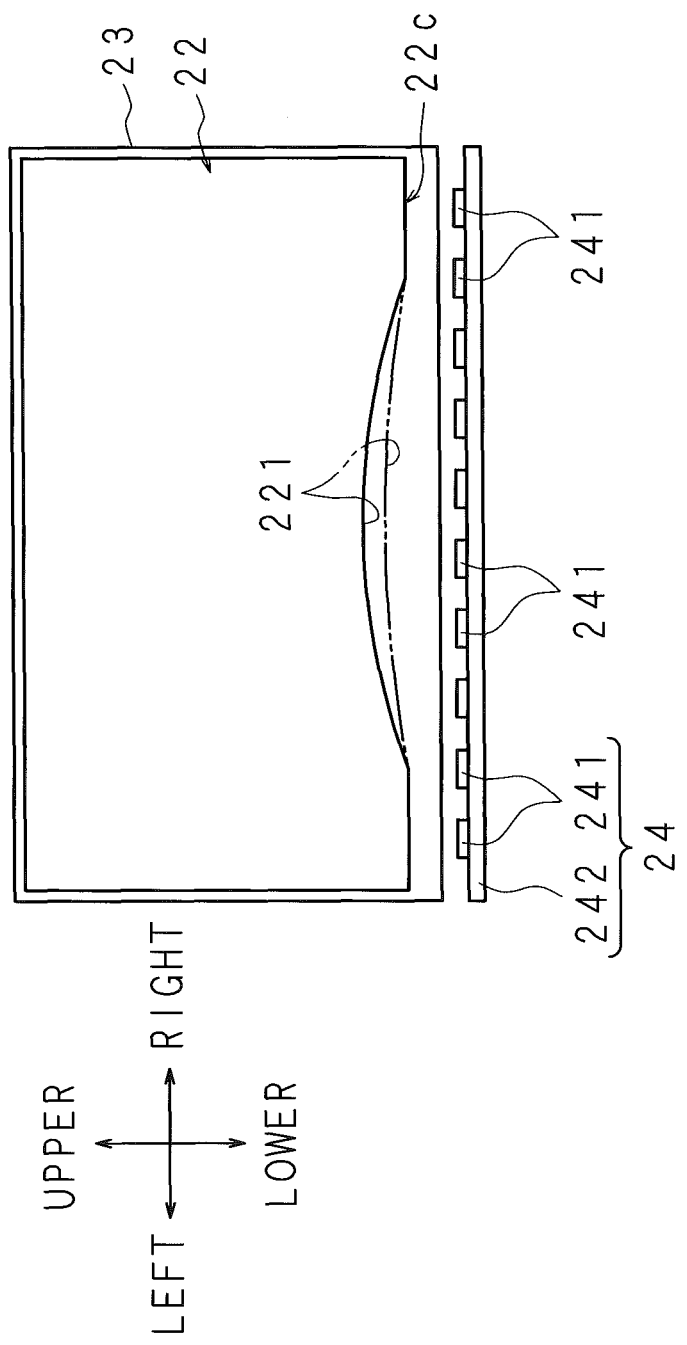
FIG. 8 is a front view schematically illustrating a positional relationship between a light guide plate and a light source included in a backlight unit as an illumination device according to Embodiment 5 of the present invention.

FIG. 8 is a front view schematically illustrating a positional relationship between a light guide plate 22 and a light source 24 included in a backlight unit 12 according to Embodiment 5 of the present invention. FIG. 8 corresponds to FIG. 3 of Embodiment 1.

The backlight unit 12 of the present embodiment has substantially the same configuration as the backlight unit 12 of Embodiment 1. Hereinafter, a difference from Embodiment 1 will be described, and the other portions corresponding to Embodiment 1 will be denoted by the same reference numerals, and will not be described.

The LED 241 is not present on the left side from the left end part (or the right side from the right end part) of the light source 24. Meanwhile, the LEDs 241, 241 and . . . are present on horizontal both sides of the middle part of the light source 24. Therefore, the brightness in the middle part of the light source 24 is higher than the brightness in the left end part (or the right end part) of the light source 24. In other words, the brightness of the light source 24 is uneven in the horizontal direction. In addition, the brightness of the light source 24 is bilaterally symmetrical.

When a difference between the brightness in the middle part of the light source 24 and the brightness in the respective left end part and right end part of the light source 24 is large, even if the distance between the lower end face 22c of the light guide plate 22 and the light source 24 is constantly maintained, the unevenness in the horizontal direction relating to the surface emission of the light guide plate 22 is not resolved. The reason is that, the amount of light having entered the horizontal middle part of the light guide plate 22 from the relatively bright middle part of the light source 24 is larger than the amount of light having entered the right and left end parts of the light guide plate 22 from the relatively dark light source 24.

The light guide plate 22 of the present embodiment has a concave part 221 even during thermal expansion thereof. However, the concave part 221 during thermal expansion may be formed in a concave shape shallower than the concave part 221 during non-thermal expansion.

Briefly, in the present embodiment, whether during thermal expansion/during non-thermal expansion of the light guide plate 22, a distance from a relatively high temperature and bright portion of the light source 24 to the lower end face 22c of the light guide plate 22 is increased, and a distance from a relatively low temperature and dark portion of the light source 24 to the lower end face 22c of the light guide plate 22 is decreased. Therefore, the amount of light having entered the light guide plate 22 may be made to be uniform in the horizontal direction.

The illumination device according to the present embodiments of the present invention is not limited to the illumination device such as the backlight unit 12 incorporated in the display apparatus 1. For example, the illumination device may be configured as a backlight of a display unit provided in mobile phones, portable information communication terminals or the like. Alternately, the illumination device may be configured as a ceiling light, a wall mounted illumination device or the like. When configuring as the ceiling light, for example, the light guide plate may be disposed in a horizontal position such that the front thereof is downward.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

In addition, as long as having the effects of the present invention, components which are not disclosed in Embodiments 1 to 5 may be included in the display apparatus 1 or the backlight unit 12.

Components (technical characteristics) disclosed in each embodiment may be combined with each other, and by combining these components, new technical characteristics may be formed.

It is noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A illumination device comprising:
   a light guide plate configured to emit light from inside through one surface of the light guide plate; and
   a light source disposed to face a peripheral surface of the light guide plate, the light source having a long side in a peripheral edge direction of the light guide plate, wherein,
   during non-light emitting of the light source, a distance between the light source and the peripheral surface of the light guide plate at a middle part of the light source in a long-side direction of the light source is longer than a distance between the light source and the peripheral surface of the light guide plate at a part except for the middle part of the light source in the long-side direction, and
   during light-emitting of the light source, the light guide plate is thermally expanded by heat generated from the light source, and a whole of the peripheral surface of the light guide plate in the long-side direction gets closer to the light source, so that a distance between the light source and the peripheral surface becomes uniform and an amount of light entering the peripheral surface of the light guide plate from the light source becomes uniform in the peripheral edge direction of the light guide plate.

2. The illumination device according to claim 1, wherein, during non-light emitting of the light source, a portion in a peripheral edge part of the light guide plate corresponding to the middle part is a concave shape.

3. The illumination device according to claim 1, wherein, during non-light emitting of the light source, for a distance s between the middle part of the light source in the long-side direction and the portion in the peripheral surface corresponding to the middle part, a distance corresponding to a central portion in the long-side direction is the longest, and is configured to be continuously or stepwise decreased from the central portion to both sides in the long-side direction.

4. A display apparatus comprising:

the illumination device according to claim 1; and a display panel which is illuminated by the illumination device from a back side of the display panel.

* * * * *